United States Patent
Yang et al.

(10) Patent No.: US 12,400,136 B2
(45) Date of Patent: Aug. 26, 2025

(54) SYSTEMS AND METHODS FOR COUNTERFACTUAL EXPLANATION IN MACHINE LEARNING MODELS

(71) Applicant: Salesforce, Inc., San Francisco, CA (US)

(72) Inventors: Wenzhuo Yang, Singapore (SG); Jia Li, Mountain View, CA (US); Chu Hong Hoi, Singapore (SG); Caiming Xiong, Menlo Park, CA (US)

(73) Assignee: Salesforce, Inc., San Francisco, CA (US)

(*) Notice: Subject to any disclaimer, the term of this patent is extended or adjusted under 35 U.S.C. 154(b) by 1206 days.

(21) Appl. No.: 17/162,967

(22) Filed: Jan. 29, 2021

(65) Prior Publication Data
US 2022/0114464 A1    Apr. 14, 2022

Related U.S. Application Data

(60) Provisional application No. 63/089,473, filed on Oct. 8, 2020.

(51) Int. Cl.
| | | |
|---|---|---|
| *G06N 5/045* | (2023.01) | |
| *G06F 18/21* | (2023.01) | |
| *G06F 18/2113* | (2023.01) | |
| *G06F 18/2413* | (2023.01) | |
| *G06F 18/243* | (2023.01) | |
| *G06N 5/01* | (2023.01) | |

(Continued)

(52) U.S. Cl.
CPC ......... *G06N 5/045* (2013.01); *G06F 18/2113* (2023.01); *G06F 18/217* (2023.01); *G06F 18/24147* (2023.01); *G06F 18/24323* (2023.01); *G06N 5/01* (2023.01); *G06N 7/01* (2023.01); *G06N 20/00* (2019.01)

(58) Field of Classification Search
CPC ........... G06N 5/045; G06N 5/01; G06N 7/01; G06N 20/00; G06N 3/045; G06N 3/047; G06N 3/088; G06N 20/20; G06F 18/2113; G06F 18/217; G06F 18/24147; G06F 18/24323; G06F 18/211
See application file for complete search history.

(56) References Cited

U.S. PATENT DOCUMENTS

| | | | |
|---|---|---|---|
| 2009/0254971 A1* | 10/2009 | Herz ................... | G06Q 10/10 726/1 |
| 2010/0082513 A1* | 4/2010 | Liu ..................... | H04L 63/1458 706/46 |

(Continued)

OTHER PUBLICATIONS

International Search Report and Written Opinion for PCT/US2021/053995, dated Feb. 2, 2022, 28 pages.

(Continued)

*Primary Examiner* — Hope C Sheffield
(74) *Attorney, Agent, or Firm* — Haynes and Boone, LLP

(57) ABSTRACT

Embodiments described herein provide a two-stage model-agnostic approach for generating counterfactual explanation via counterfactual feature selection and counterfactual feature optimization. Given a query instance, counterfactual feature selection picks a subset of feature columns and values that can potentially change the prediction and then counterfactual feature optimization determines the best feature value for the selected feature as a counterfactual example.

20 Claims, 20 Drawing Sheets

(51) Int. Cl.
*G06N 7/01* (2023.01)
*G06N 20/00* (2019.01)

(56) References Cited

U.S. PATENT DOCUMENTS

| | | | |
|---|---|---|---|
| 2014/0025509 A1* | 1/2014 | Reisz | G06Q 30/0244 |
| | | | 705/14.71 |
| 2019/0220772 A1* | 7/2019 | Schmidt | G06F 16/2453 |
| 2020/0090075 A1* | 3/2020 | Achin | G06Q 30/0201 |
| 2020/0097997 A1* | 3/2020 | Li | G06N 20/00 |
| 2020/0126126 A1* | 4/2020 | Briancon | G06N 20/20 |
| 2020/0401891 A1* | 12/2020 | Xu | G06N 3/08 |
| 2021/0064517 A1* | 3/2021 | Wong | G06F 11/3698 |
| 2021/0117508 A1* | 4/2021 | Chang | G06F 17/18 |
| 2021/0117784 A1* | 4/2021 | Flinn | G06F 18/2148 |

OTHER PUBLICATIONS

Mothilal et al., "Explaining Machine Learning Classifiers Through Diverse Counterfactual Explanations", Arxiv.Org, Cornell University Library, 201 Olin Library Cornell University Ithaca, NY 14853, May 19, 2019, 13 Pages, KP081546163.

Guidotti, et al., "Factual and Counterfactual Explanations for Black-Box Decision Making,", p. 2, Section II, under "Local Rule-Based Explanations of Black Box Decision System,", IEEE Intelligent Systems Journal, 2019, pp. 1-7.

* cited by examiner

Algorithm 1 NN search for counterfactual feature selection

Input: Training data $\mathcal{D}$, query instance x with predicted label $y$, number of nearest neighbors $K$, number of selected feature columns $s$, number of selected values for each feature $m$.

Procedure:

1) Initialize: for each label $l \in \{0, 1\}$, build nearest neighbor search index $tree_l$ with data $\{x_i | y_i = l \text{ for } (x_i, y_i) \in \mathcal{D}\}$;

2) Let $y' = 1 - y$ and find the $K$ nearest neighbors via $tree_{y'}$. Denote them by $\mathcal{Z} = \{z_1, \cdots, z_K\}$;

3) Initialize $col\_count$ that counts the number of changed feature columns in $\mathcal{Z}$, e.g., $col\_count[c] = |\{i : z_i[c] \neq x[c] \text{ for } i = 1, \cdots, K\}|$;

4) Initialize $val\_count$ that counts the number of changed feature values in $\mathcal{Z}$, e.g., $val\_count[c][v]$ is the number of appearances of value $v$ for feature column $c$;

for $c$ in features do

5) $col\_count[c]\mathrel{+}= 1$ if $x_c \neq z_{i,c}$ for each $z_i \in \mathcal{Z}$;

6) $val\_count[c][z_{i,c}]\mathrel{+}= 1$ if $x_c \neq z_{i,c}$ for each $z_i \in \mathcal{Z}$;

end for

7) Sort the feature columns in descending order w.r.t. the count $col\_count[c]$ and pick the top $s$ feature columns. Denote the selected feature columns by $C$;

8) For each $c$ in $C$, sort the elements in $val\_count[c]$ in descending order w.r.t. $val\_count[c][v]$ and pick the top $m$ feature values. Denote the selected feature values by $\mathcal{V}(c)$.

9) Return $C$ and $\mathcal{V}(C) = \{\mathcal{V}(c) | c \in C\}$.

*FIG. 5*

Algorithm 2 Generate training data for a recommendation model

Input: Training data $\mathcal{D}$, classifier $f(\cdot)$, number of nearest neighbors $K$.

Procedure:
    1) Do prediction with classifier $f(\cdot)$, i.e., $\mathcal{X} = \{(x_i, f(x_i)) \text{ for } i = 1, \ldots, n\}$ where $f(x_i)$ is the predicted label for $x_i$;
    2) For each label $l \in \{0, 1\}$, build nearest neighbor search index $tree_l$ with data $\{x_i | y_i = l \text{ for } (x_i, y_i) \in \mathcal{X}\}$;
    3) Initialize dataset $\mathcal{R}$ to empty;
    for $(x_i, y_i)$ in $\mathcal{X}$ do
        4) Find the $K$ nearest neighbors of $x_i$ via $tree_{1-y_i}$ and denote them as $\mathcal{Z} = \{z_1, \ldots, z_K\}$;
        for $c$ in features do
            5) If $x_{i,c} \neq z_{j,c}$ for each $z_j \in \mathcal{Z}$, add $(x_i, y_i, c, z_{j,c})$ into $\mathcal{R}$
        end for
    end for
    6) Return dataset $\mathcal{R}$.

*FIG. 6*

Algorithm 3 Model-based counterfactual feature selection

Input: Training data $\mathcal{D}$, query instance x with predicted label $y$, number of selected feature columns $s$ and number of selected feature values for each feature $m$.

Procedure:
1) The trained recommendation model does prediction with input (x, $y$), generating probabilities $P$ and $\{Q(c_1), \cdots, Q(c_d)\}$;
2) Sort probability $P$ in descending order and pick the top $s$ feature columns with the highest probabilities. Denote the selected feature columns by $C$;
3) For each $c$ in $C$, sort probability $Q(c)$ in descending order and choose the top $m$ feature values. Denote the selected feature values by $\mathcal{V}(c)$.
4) Return $C$ and $\mathcal{V}(C) = \{\mathcal{V}(c) | c \in C\}$.

*FIG. 7*

Algorithm 4 The RL-based counterfactual feature optimization

Input: Classifier $f(\cdot)$, query instance $(x, y)$, the selected features $C$ and $\mathcal{V}(C)$, sparsity parameter $w$ and batch size $B$.

Procedure:
1) Solve Problem (5) by the REINFORCE algorithm to obtain the optimal solution $\theta^* = \{p_1^*, \cdots, p_s^*, q_1^*, \cdots, q_s^*\}$;
2) Sort $(p_1^*, \cdots, p_s^*)$ in descending order and pick the top $w$ ones with the highest values. Denote the selected features by $C^*$;
3) For each $c$ in $C^*$, pick the feature value $v_c^*$ such that $v_c^* = \arg\max_i q_{c,i}^*$. Set $\mathcal{F}^* = \{(c, v_c^*) \mid c \in C^*\}$ and $x_0' = x$;
4) Sort $\mathcal{F}^*$ in descending order w.r.t. $p_c^*$ for $(c, \_)$ in $\mathcal{F}^*$;
5) For $(c, v)$ in the sorted $\mathcal{F}^*$: set $x_0'[c] = v$, and break the loop if $f_{1-y}(x_0') > 0.5$;
6) Sample $B$ actions based on policy $\pi_{\theta^*}$ and construct the corresponding examples $\{x_1', \cdots, x_B'\}$;
7) Return $\mathcal{E} = \{x_0'\} \cup \{x_i' : f_{1-y}(x_i') > 0.5 \text{ for } i = 1, \cdots, B\}$;

*FIG. 9*

Algorithm 5 GLD counterfactual feature optimization

Input: Classifier $f(\cdot)$, query instance x with predicted label $y$, selected features $C$ and $\mathcal{V}(C)$, regularization weight $\lambda$, maximum search radius $R$, minimum search radius $r$, number of epochs $E$ and number of iterations per epoch $T$.

Procedure:

1) Set $K = \log(R/r)$ and let $\mathcal{X}$ be an empty list;
2) Initialize the values in $\mu, v_1, \cdots, v_s$ to 0.5;

for $e = 1, \cdots, E$ do
   for $t = 1, \cdots, T$ do
     3) Let $\mathcal{T}_t$ be an empty list;
     for $k = 1, \cdots, K$ do
        4) Set $r_k = 2^{-k}R$;
        5) Set $\mu_k = \mu + z * r_k$ where $z \sim \mathcal{N}(0, 1)$;
        6) Set $v_{i,k} = v_i + z * r_k$ where $z \sim \mathcal{N}(0, 1)$ for $i \in [s]$;
        7) Set $x'_k = g(x, \mu_k, v_{1,k}, \cdots, v_{s,k})$;
        8) Add $(x'_k, \mu_k, v_{1,k}, \cdots, v_{s,k})$ into $\mathcal{T}_t$ if $f_{1-y}(x'_k) > 0.5$;
     end for
     9) Update $x', \mu, v_1, \cdots, v_s$ to be the best solution of (9) in $\mathcal{T}_t$, and add $x'$ into the solution list $\mathcal{X}$;
   end for
   10) Set $\mu = \mathbb{1}[\mu > 0.5] * 0.55$;
end for
11) Pick $x' \in \mathcal{X}$ that minimizes (8) and return $x'$ as a counterfactual example.

(braces label: 1001, 1002, 1003)

*FIG. 10A*

Algorithm 5 The GLD method for continuous feature fine-tuning

Input: Classifier $f(\cdot)$, query instance $(x, y)$, CF example $x'$, maximum search radius $R$, minimum search radius $r$, and number of iterations per epoch $T$.

Procedure:

1) Set $K = \log(R/r)$ and let $\mathcal{X}$ be an empty list;
2) Set $C = \{i : \text{feature } i \text{ is continuous and } x'[i] \neq x[i]\}$ and set $z = x'$;

for $t = 1, \cdots, T$ do

3) Let $\mathcal{T}_t$ be an empty list;

for $k = 1, \cdots, K$ do

4) Set $r_k = 2^{-k}R$;

5) Set $z_k[i] = \text{Clip}(z[i] + a * r_k, 0, 1)$ where $a \sim \mathcal{N}(0, 1)$ for each $i \in C$;

6) Add $z_k$ into $\mathcal{T}_t$ if $h_{-n}(z_k) > 0.5$;

end for

7) Update $z$ to be the best solution of (8) in $\mathcal{T}_t$, and add $z$ into the solution list $\mathcal{X}$;

end for

8) Return $z \in \mathcal{X}$ that minimizes (8).

*FIG. 10B*

Algorithm 6 Generating diverse CF examples

Input: The optimal policy $\pi_{\theta^*}$ obtained by Algorithm 2 or the sets $\{\mathcal{T}_i\}$ obtained by Algorithm 3, parameter $K$.

Procedure:
    1a) For Algorithm 2, construct $\mathcal{E}$ via $\pi_{\theta^*}$;
    1b) For Algorithm 3, construct $\mathcal{E}$ via the union of $\{\mathcal{T}_i\}$;
    2) Sort $\mathcal{E}$ in ascending order based on the scores $-\lambda f_{1-y}(x') + \frac{1}{d}\|x' - x\|_0$ for $x' \in \mathcal{E}$;
    3) Initialize counts $c[f]$ for each feature $f$ to be 0 and set $\mathcal{R}$ to be an empty list;
    for $x' \in$ sorted $\mathcal{E}$ do
        4) Let $\mathcal{D}(x')$ be the set of features $f$ such that $x'[f] \neq x[f]$;
        5) For each feature $f \in \mathcal{D}(x')$, if there is no $c[f] >= K$, then add $x'$ into $\mathcal{R}$ and update $c[f] += 1$ for $f \in \mathcal{D}(x')$;
    end for
    6) Return the diverse set $\mathcal{R}$.

*FIG. 11*

Table 1: The validity for Greedy, SHAP-based, CERTIFAI, Foil Trees, our RL and GLD with the XGBoost classifier.

|              | Adult | Breast | COMPAS | Credit | Titanic |
|---|---|---|---|---|---|
| Greedy       | 0.95  | 1.00   | 0.94   | 0.94   | 1.00    |
| SHAP-based   | 0.95  | 1.00   | 0.91   | 0.95   | 1.00    |
| CERTIFAI     | 0.95  | 0.99   | 1.00   | 1.00   | 1.00    |
| CE Foil Trees| 0.21  | 0.00   | 0.11   | 0.00   | 0.36    |
| Ours RL      | 0.98  | 1.00   | 1.00   | 1.00   | 1.00    |
| Ours GLD     | 0.99  | 1.00   | 1.00   | 1.00   | 1.00    |

FIG. 12

Table 2: The sparsity for Greedy, SHAP-based, CERTIFAI, Foil Trees, our RL and GLD with the XGBoost classifier.

|              | Adult | Breast | COMPAS | Credit | Titanic |
|---|---|---|---|---|---|
| Greedy       | 1.81  | 1.99   | 1.38   | 1.39   | 1.30    |
| SHAP-based   | 1.89  | 2.07   | 1.66   | 1.43   | 1.39    |
| CERTIFAI     | 1.56  | 2.21   | 1.44   | 3.46   | 1.43    |
| CE Foil Trees| 1.75  | -      | 1.36   | -      | 1.47    |
| Ours RL      | 1.69  | 1.97   | 1.33   | 1.29   | 1.26    |
| Ours GLD     | 1.67  | 2.12   | 1.34   | 1.34   | 1.28    |

FIG. 13

Table 3: The average prediction scores of the desired labels for the generated counterfactual examples with the XGBoost classifier.

|              | Adult | Breast | COMPAS | Credit | Titanic |
|---|---|---|---|---|---|
| Greedy       | 0.683 | 0.742  | 0.604  | 0.726  | 0.808   |
| SHAP-based   | 0.661 | 0.751  | 0.599  | 0.718  | 0.803   |
| CERTIFAI     | 0.580 | 0.689  | 0.626  | 0.676  | 0.693   |
| CE Foil Trees| 0.589 | -      | 0.582  | -      | 0.638   |
| Ours RL      | 0.699 | 0.757  | 0.642  | 0.739  | 0.824   |
| Ours GLD     | 0.693 | 0.725  | 0.626  | 0.726  | 0.824   |

FIG. 14

Table 4: The validity for Greedy, SHAP-based, CERTIFAI, DiCE, Foil Trees, our RL and GLD with the MLP classifier.

|               | Adult | Breast | COMPAS | Credit | Titanic |
|---------------|-------|--------|--------|--------|---------|
| Greedy        | 1.00  | 1.00   | 0.98   | 0.98   | 1.00    |
| SHAP-based    | 0.98  | 1.00   | 0.98   | 0.98   | 1.00    |
| CERTIFAI      | 0.98  | 0.93   | 1.00   | 0.97   | 1.00    |
| DiCE          | 1.00  | 1.00   | 1.00   | 1.00   | 1.00    |
| CE Foil Trees | 0.28  | 0.00   | 0.15   | 0.00   | 0.34    |
| Ours RL       | 1.00  | 1.00   | 1.00   | 1.00   | 1.00    |
| Ours GLD      | 1.00  | 1.00   | 1.00   | 1.00   | 1.00    |

FIG. 15

Table 5: The sparsity for Greedy, SHAP-based, CERTIFAI, DiCE, Foil Trees, our RL and GLD with the MLP classifier.

|               | Adult | Breast | COMPAS | Credit | Titanic |
|---------------|-------|--------|--------|--------|---------|
| Greedy        | 1.53  | 2.89   | 1.52   | 1.29   | 1.27    |
| SHAP-based    | 1.71  | 2.92   | 1.72   | 1.29   | 1.27    |
| CERTIFAI      | 1.54  | 2.72   | 1.44   | 1.98   | 1.28    |
| DiCE          | 2.93  | 5.37   | 2.10   | 11.84  | 3.24    |
| CE Foil Trees | 1.46  | -      | 1.47   | -      | 1.10    |
| Ours RL       | 1.47  | 2.87   | 1.43   | 1.29   | 1.27    |
| Ours GLD      | 1.50  | 2.91   | 1.49   | 1.32   | 1.29    |

FIG. 16

Table 6: The average prediction scores of the desired labels for the generated counterfactual examples with the MLP classifier.

|  | Adult | Breast | COMPAS | Credit | Titanic |
|---|---|---|---|---|---|
| Greedy | 0.703 | 0.719 | 0.639 | 0.676 | 0.805 |
| SHAP-based | 0.693 | 0.726 | 0.563 | 0.660 | 0.794 |
| CERTIFAI | 0.633 | 0.636 | 0.628 | 0.709 | 0.766 |
| DiCE | 0.582 | 0.546 | 0.544 | 0.535 | 0.599 |
| CE Foil Trees | 0.664 | - | 0.588 | - | 0.818 |
| Ours RL | 0.712 | 0.720 | 0.654 | 0.697 | 0.816 |
| Ours GLD | 0.695 | 0.674 | 0.624 | 0.685 | 0.794 |

FIG. 17

Table 7: The running time for generating counterfactual examples (seconds per query).

|  | Adult | Breast | COMPAS | Credit | Titanic |
|---|---|---|---|---|---|
| Greedy | 0.030 | 0.056 | 0.024 | 0.058 | 0.032 |
| SHAP-based | 0.106 | 0.226 | 0.041 | 0.645 | 0.064 |
| CERTIFAI | 0.786 | 0.703 | 0.957 | 0.912 | 1.145 |
| DiCE | 2.815 | 5.472 | 3.991 | 2.928 | 2.070 |
| CE Foil Trees | 0.018 | 0.016 | 0.016 | 0.017 | 0.025 |
| Ours RL | 0.115 | 0.110 | 0.107 | 0.139 | 0.120 |
| Ours GLD | 0.254 | 0.236 | 0.234 | 0.314 | 0.262 |

FIG. 18

Table 8: Counterfactual examples and counterfactual features generated by the optimal policy on the Adult dataset. The top-4 CF feature columns and top-1 CF feature value are selected for each example.

|  | Label | Age | Workclass | Education | Marital | Occupation | Race | Gender | Working hours |
|---|---|---|---|---|---|---|---|---|---|
| Original | <= 50K | 50 | Self-Employed | Bachelors | Married | White-Collar | White | Male | 13 |
| Counterfactual | > 50K | 50 | Self-Employed | Doctorate | Married | White-Collar | White | Male | 13 |
| CF features | - | - | - | Doctorate | - | Professional | - | - | 37.5 |
| Original | <= 50K | 38 | Private | HS-grad | Divorced | Blue-Collar | White | Male | 40 |
| Counterfactual | > 50K | 38 | Private | Prof-school | Married | Blue-Collar | White | Male | 40 |
| CF features | - | - | - | Prof-school | Married | Professional | - | - | 51.5 |
| Original | <= 50K | 32 | Private | HS-grad | Single | Blue-Collar | White | Male | 40 |
| Counterfactual | > 50K | 32 | Private | HS-grad | Married | Blue-Collar | White | Male | 77 |
| CF features | - | - | - | Doctorate | Married | White-Collar | - | - | 77 |

*FIG. 19*

Table 9: Counterfactual examples and counterfactual features generated by the optimal policy on the Titanic dataset. The top-4 CF feature columns and top-1 CF feature value are selected for each example.

|  | Label | Ticket class | Sex | Age | SibSp | Parch | Fare | Embarked |
|---|---|---|---|---|---|---|---|---|
| Original | not survival | 3 | male | 22 | 1 | 0 | 1.9811 | S |
| Counterfactual | survival | 3 | female | 22 | 1 | 0 | 1.9811 | S |
| CF features | - | - | female | - | 0 | - | - | C |
| Original | survival | 1 | female | 35 | 1 | 0 | 3.9721 | S |
| Counterfactual | not survival | 3 | female | 63 | 1 | 0 | 3.9721 | S |
| CF features | - | - | - | 63 | - | - | - | - |
| Original | not survival | 3 | male | 8 | 3 | 1 | 3.0481 | S |
| Counterfactual | survival | 1 | female | 8 | 3 | 1 | 3.0481 | S |
| CF features | - | 1 | female | - | 2 | 2 | - | C |

*FIG. 20*

Table 10: Diverse counterfactual examples generated by our method on the Adult dataset.

| | Label | Age | Workclass | Education | Marital | Occupation | Race | Gender | Working hours |
|---|---|---|---|---|---|---|---|---|---|
| Original | > 50K | 28 | Private | Bachelors | Married | Professional | Other | Female | 40 |
| Counterfactual 1 | <= 50K | 28 | Private | Bachelors | Single | Professional | Other | Female | 40 |
| Counterfactual 2 | <= 50K | 28 | Private | School | Married | Professional | Other | Female | 40 |
| Counterfactual 3 | <= 50K | 23 | Private | Bachelors | Married | Professional | Other | Female | 40 |
| Original | <= 50K | 31 | Private | Masters | Single | Professional | White | Female | 50 |
| Counterfactual 1 | > 50K | 31 | Private | Masters | Married | Professional | White | Female | 50 |
| Counterfactual 2 | > 50K | 31 | Private | Doctorate | Single | Professional | White | Female | 50 |
| Counterfactual 3 | > 50K | 31 | Private | Masters | Single | White-Collar | White | Female | 50 |

*FIG. 22*

Table 11: Diverse counterfactual examples generated by our method on the Titanic dataset.

| | Label | Ticket class | Sex | Age | SibSp | Parch | Fare | Embarked |
|---|---|---|---|---|---|---|---|---|
| Original | survival | 1 | female | 35 | 1 | 0 | 3.9722 | S |
| Counterfactual 1 | not survival | 3 | male | 35 | 1 | 0 | 3.9722 | S |
| Counterfactual 2 | not survival | 3 | female | 35 | 1 | 0 | 3.2959 | S |
| Counterfactual 3 | not survival | 1 | male | 46 | 1 | 0 | 3.9722 | S |
| Original | survival | 2 | female | 55 | 0 | 0 | 2.7727 | S |
| Counterfactual 1 | not survival | 2 | male | 55 | 2 | 0 | 2.7727 | S |
| Counterfactual 2 | not survival | 2 | male | 55 | 0 | 2 | 2.7727 | S |
| Counterfactual 3 | not survival | 3 | female | 55 | 1 | 0 | 2.7727 | S |

*FIG. 23*

Table 12: The average sparsity metrics for the generated diverse CF examples with the MLP classifier.

|  | Adult | Breast | COMPAS | Credit | Titanic |
|---|---|---|---|---|---|
| CERTIFAI | 1.86 | 3.33 | 1.94 | 2.42 | 1.75 |
| DiCE | 3.14 | 5.81 | 2.27 | 11.99 | 3.69 |
| Ours RL | 1.71 | 3.08 | 1.58 | 1.73 | 1.48 |
| Ours GLD | 1.75 | 3.02 | 1.68 | 1.74 | 1.54 |

*FIG. 24*

Table 13: The diversity metrics for the generated diverse CF examples with the MLP classifier.

|  | Adult | Breast | COMPAS | Credit | Titanic |
|---|---|---|---|---|---|
| CERTIFAI | 0.54 | 0.33 | 0.44 | 0.41 | 0.49 |
| DiCE | 0.96 | 0.98 | 0.88 | 0.67 | 0.86 |
| Ours RL | 0.79 | 0.72 | 0.80 | 0.54 | 0.71 |
| Ours GLD | 0.69 | 0.56 | 0.69 | 0.51 | 0.65 |

*FIG. 25*

Table 14: The running time for generating diverse CF examples (seconds per query).

|  | Adult | Breast | COMPAS | Credit | Titanic |
|---|---|---|---|---|---|
| CERTIFAI | 0.770 | 0.756 | 0.969 | 0.933 | 1.147 |
| DiCE | 7.096 | 8.240 | 5.815 | 5.039 | 3.707 |
| Ours RL | 0.115 | 0.110 | 0.112 | 0.158 | 0.118 |
| Ours GLD | 0.272 | 0.246 | 0.245 | 0.319 | 0.268 |

*FIG. 26*

Table 15: The sparsity and running time for generating CF examples with time series data. The original label is "ft".

| Desired label | CoMD | | bt | | cg | | kripke | | lu | |
|---|---|---|---|---|---|---|---|---|---|---|
| | Sparsity | Time(s) | Sparsity | Time(s) | Sparsity | Time(s) | Sparsity | Time(s) | Sparsity | Time(s) |
| Greedy | 16.7 | 27.7 | 12.2 | 19.6 | 6.6 | 9.9 | 15.8 | 25.9 | 13.3 | 22.1 |
| Ours RL | 18.9 | 1.8 | 14.5 | 1.8 | 7.1 | 1.7 | 18.8 | 1.8 | 14.0 | 1.8 |
| Ours GLD | 22.5 | 1.8 | 16.3 | 1.8 | 8.0 | 1.8 | 21.1 | 1.8 | 13.1 | 1.8 |

| Desired label | mg | | miniAMR | | miniGhost | | miniMD | | sp | |
|---|---|---|---|---|---|---|---|---|---|---|
| | Sparsity | Time(s) | Sparsity | Time(s) | Sparsity | Time(s) | Sparsity | Time(s) | Sparsity | Time(s) |
| Greedy | 7.4 | 10.9 | 19.6 | 31.7 | 13.4 | 22.4 | 15.5 | 25.8 | 17.1 | 26.7 |
| Ours RL | 8.3 | 1.7 | 19.3 | 1.9 | 17.2 | 1.8 | 22.2 | 1.9 | 20.5 | 1.8 |
| Ours GLD | 9.4 | 1.8 | 19.6 | 1.8 | 16.5 | 1.8 | 21.3 | 1.8 | 20.0 | 1.8 |

FIG. 27

SYSTEMS AND METHODS FOR COUNTERFACTUAL EXPLANATION IN MACHINE LEARNING MODELS

The present application is a nonprovisional of and claims priority under 35 U.S.C. 119 to U.S. provisional application No. 63/089,473, filed on Oct. 8, 2020.

The present application is related to U.S. nonprovisional application Ser. No. 17/162,931, filed on Jan. 29, 2021.

All of the aforementioned applications are hereby expressly incorporated by reference herein in their entirety.

TECHNICAL FIELD

The present disclosure relates generally to machine learning models and neural networks, and more specifically, to a counterfactual explanation system via candidate counterfactual feature selection and optimization for machine learning models.

BACKGROUND

Machine learning models are widely-applied in various applications, leading to promising results especially in computer vision, natural language processing, and recommendation systems. As the adoption of these models grows rapidly, their algorithmic decisions in healthcare, education and finance can potentially have a huge social impact on the public. However, many machine learning models, and in particular deep learning models, generally work as black-box models, providing little visibility and knowledge on why certain decisions are made. The lack of explainability remains a key concern in many applications and thus hampers further implementation of machine learning/artificial intelligence (AI) systems with full trust and confidence.

BRIEF DESCRIPTION OF THE DRAWINGS

FIG. 5 provides an example pseudo-code segment illustrating an algorithm of the nearest neighbor search approach for generating counterfactual features, according to embodiments described herein.

FIG. 6 provides an example pseudo-code segment illustrating an algorithm of building a recommendation model for generating counterfactual features, according to embodiments described herein.

FIG. 7 provides an example pseudo-code segment illustrating an algorithm of generating counterfactual feature selections based on a recommendation model, according to embodiments described herein.

FIG. 9 provides an example pseudo-code segment illustrating an algorithm of reinforcement learning based counterfactual feature optimization for generating a counterfactual example given selected counterfactual features, according to embodiments described herein.

FIGS. 10A-10B provide alternative example pseudo-code segments illustrating an algorithm of gradientless descent based counterfactual feature optimization for generating a counterfactual example given selected counterfactual features, according to embodiments described herein.

FIG. 11 provides an example pseudo-code segment illustrating an algorithm of generating diverse counterfactual examples, according to embodiments described herein.

FIGS. 12-27 provide example data tables illustrating data experiment results of the counterfactual example generation, according to one embodiment.

Figure 1:
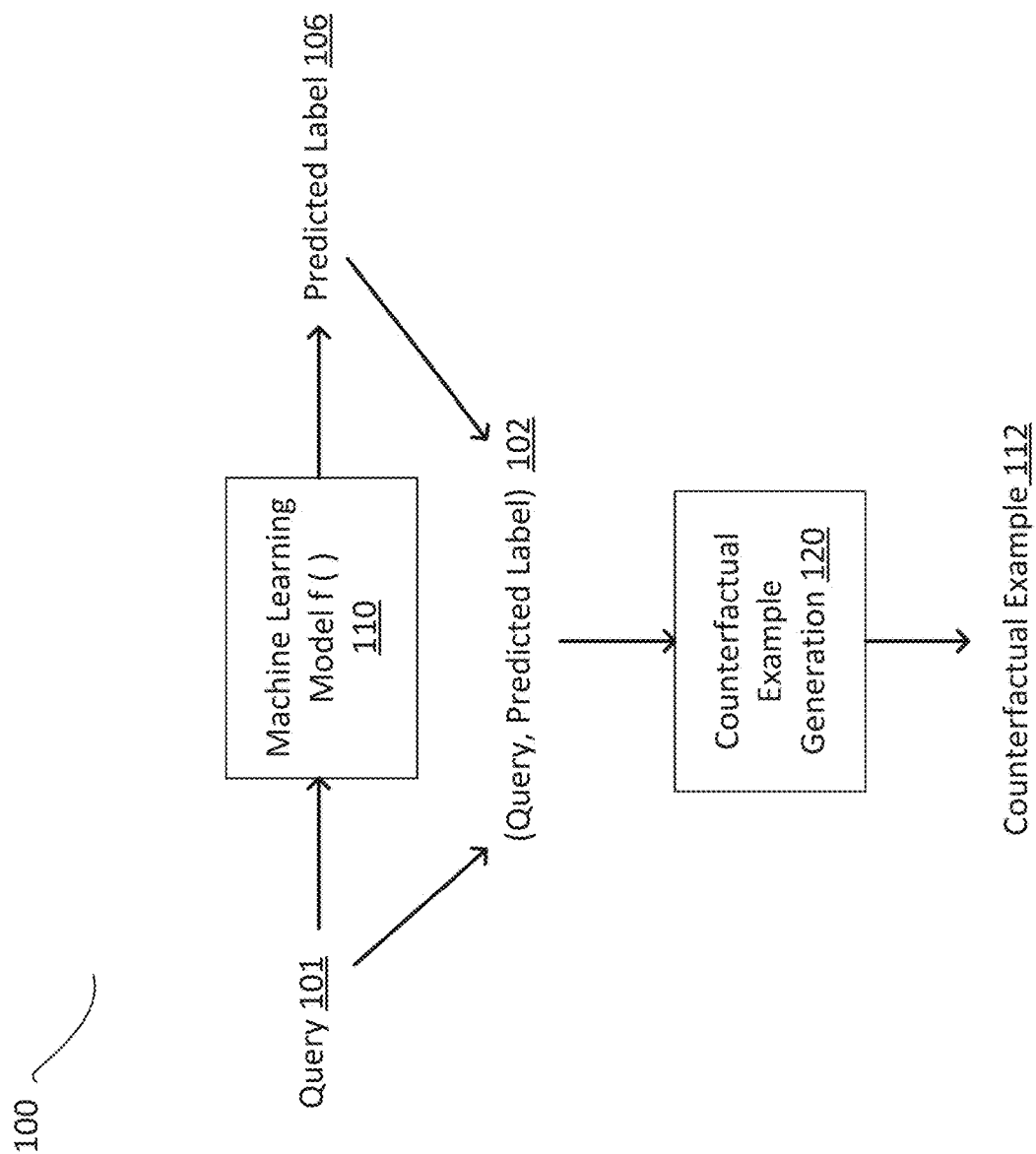
FIG. 1 shows a simplified diagram illustrating an overview of generating counterfactual explanations for a machine learning model, according to the embodiments described herein.

In the figures, elements having the same designations have the same or similar functions.

DETAILED DESCRIPTION

Explainable AI (XAI) provides explanations on how those black box decisions of AI systems are made. Such explanations can improve the transparency, persuasiveness and trustworthiness of AI systems and help AI developers to debug and improve model performance. Counterfactual explanation is one of various explanations for AI systems, which are defined as generated examples that are obtained by performing minimal changes in the original instance's features to have a predefined output. Specifically, a causal situation is described in the form "is it input X that caused the model to predict Y" or "Y would not have occurred if X had not occurred."

For example, consider a person who submitted a credit card application and was rejected by the AI system of a financial company. The applicant may require the company to explain about the decision. The counterfactual explanation not only provides an explanation on why the application was rejected but also helps the applicant to understand what he or she could have done to change this decision, e.g., "if your income was higher than $5000/year, your application would have been approved." Unlike the explanations based on feature importance that are adopted by some existing systems, counterfactual explanations allow users to explore "what-if" scenarios and obtain a deeper understanding about the underlying AI models.

Existing approaches for counterfactual explanations are generally optimization-based, mostly assuming that the underlying AI model is differentiable and static, i.e., the model is fixed and easy to compute gradients with respect to its inputs. This assumption may be valid for neural network-based models but is largely invalid for tree boosting models such as the widely-applied model XGBoost. Besides, these methods do not handle categorical features with many different values (e.g., non-numerical values) well. For example, an existing method converts categorical features into one-hot encoding representations and then treats them as continuous features. This relaxation introduces many new variables, which complicates the original optimization problem and downgrades the sparsity of the generated counterfactual examples. To ensure real-world feasibility of counterfactual examples, additional constraints have to be imposed on features especially for continuous features, much enhancing the complexity of the original optimization problem.

Thus, in view of the issues with the existing counterfactual explanation systems, embodiments described herein provide a two-stage model-agnostic approach for generating counterfactual explanation via counterfactual feature selection and counterfactual feature optimization. Specifically, counterfactual feature selection is adopted for roughly finding feature columns and values in a query instance so that modifying them can probably change its predicted label. The features may be identified via a nearest-neighbor (NN) search in the feature space of each feature of a data example. Or alternatively, a feature recommendation model is developed for counterfactual feature selection, which can shrink the search space for finding counterfactual examples and reduce the computational time for the next step, i.e., counterfactual feature optimization.

Counterfactual feature optimization is then adopted as a finetuning procedure given the candidate counterfactual features extracted from counterfactual feature selection. The counterfactual feature optimization may be treated as a reinforcement learning (RL) problem that for finding the best counterfactual features. Or alternatively, a gradientless descent (GLD) method can be adopted to further finetune continuous counterfactual features.

Therefore, in this way, the obtained optimal counterfactual features may be used as the explanation that provides more details for users to explain the reasons behind a machine learning decision. In addition, the optimal policy obtained by the RL-based method may provide more details for users to explore "what-if" scenarios and discover if there exists bias in a dataset.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

FIG. 1 shows a simplified diagram 100 illustrating an overview of generating counterfactual explanations for a machine learning model, according to the embodiments described herein. Diagram 100 shows a framework that may be implemented together with a trained machine learning model 110 $f(\ )$ e.g., XGBoost or deep learning models. In response to a query 101, represented by $x \in \mathbb{R}^d$, the trained machine learning model 110 may generate a predicted label 106 y. The objective is to generate a counterfactual example 112 $x' \in \mathbb{R}^d$ such that its predicted label y' from the machine learning model $f(\ )$ 110 is different from predicted label 106 y.

For example, the machine learning model 110 may be a binary-class classification problem of predicting whether the income of a person exceeds $50K/yr based on her attributes such as age, education, working hours, and/or the like. The classifier is trained with the census income data. From basic statistical analysis, if her age is above 30 or her education is higher than a bachelor's degree or she has a longer working hours, she probably has an income exceeding $50K/yr. Given a query instance 102 with "age=20, education=high school, working hours=30, predicted income <$50K/yr" to explain, the counterfactual example generation 120 may generate a counterfactual example 112 of "age=30, education=master, working hours=30, predicted income >$50K/yr" with the different predicted label "income >$50K/yr." Thus, by comparing the attributes between the query instance 102 and counterfactual example 112, an explanation may be offered that attributes "age=20" and "education=high school" may be determining attributes that cause the prediction "income <$50K/yr."

Figure 2:
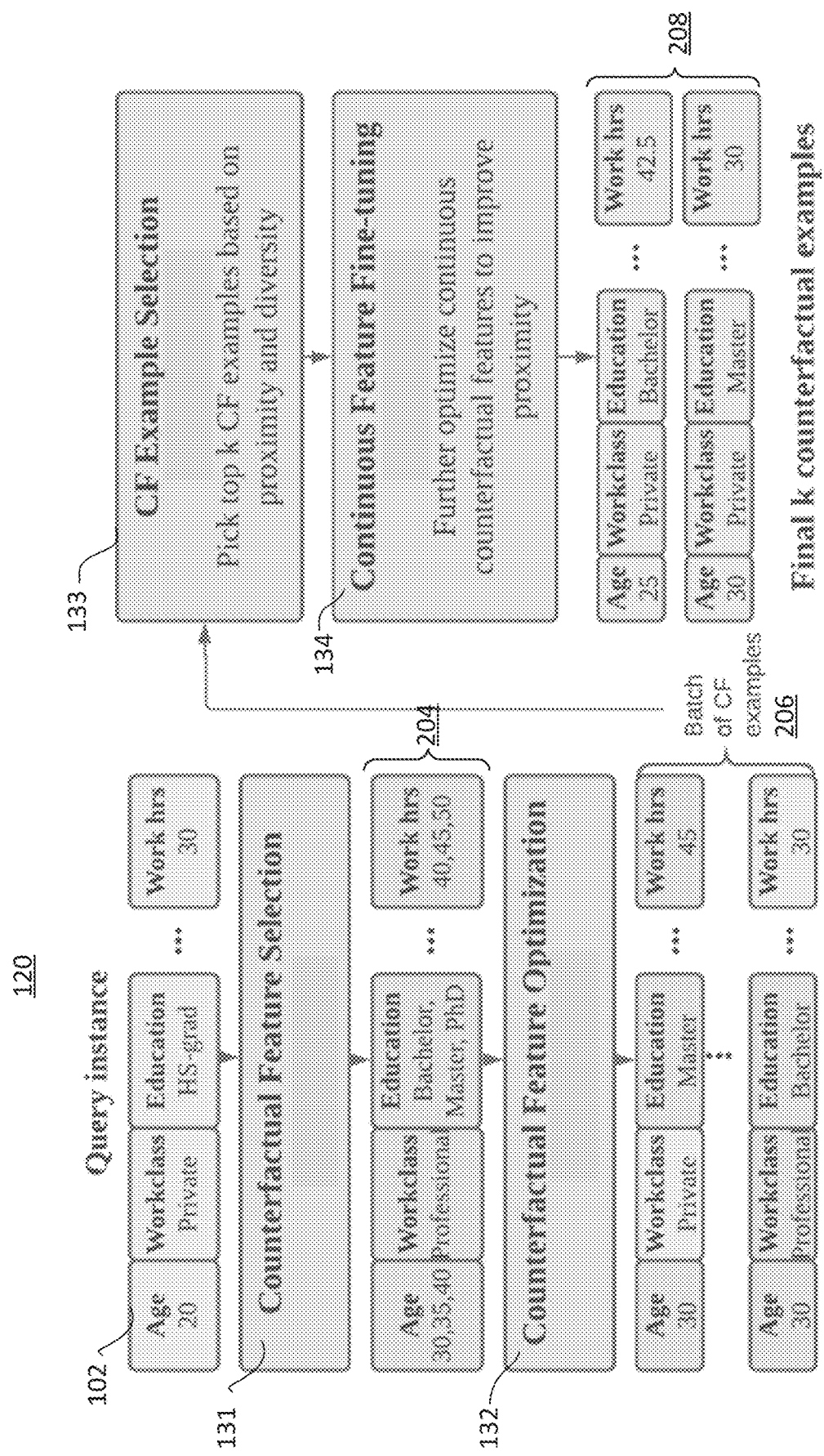
FIG. 2 provides an overview of the counterfactual example generation module shown in FIG. 1, according to embodiments described herein.

FIG. 2 provides an overview of the counterfactual example generation module 120 shown in FIG. 1, according to embodiments described herein. Traditionally, counterfactual example generation has been formulated as an optimization problem by minimizing the distance between x and x' subject to that f (x') y. This optimization problem is usually hard to solve due to the complexity of machine learning model f (·), categorical features in x and the real-world feasibility constraints on x'. The counterfactual example generation module 120 adopts a two-stage approach including the counter feature selection 131 and counterfactual feature optimization 132 as further described below.

Given a query instance 102, counterfactual feature selection module 131 selects a subset of feature columns and values that can potentially change the prediction. In the example of the binary classifier to predict whether a person's income exceeds $50K/yr given their age, education and working hours, instead of considering the whole domains for age, education and working hours when generating counterfactual examples, the counterfactual feature selection module 131 narrows down the domains to "age ≥30, education∈[bachelor, master, doctorate], working hours ≥40". The narrowed domains can then be used to simplify the optimization procedure and lead to more reliable explanations since the search space is reduced, and the narrowed domain has already taken into consideration real-world feasibility of possible counterfactual examples.

In addition to narrowing down the domains, as a rough estimate for continuous features in a counterfactual example x' is often noted in a counterfactual example, e.g., "working hours=range [45,50]" in x' is accept-able, there is no need to compute an exact value for the attribute such as "working hours=48.5". Therefore, instead of converting categorical features into continuous ones by traditional optimization approaches, continuous features are converted into categorical ones by discretizing them into k bins before counterfactual feature selection.

Thus, as shown in FIG. 2, counterfactual feature selection module 131 picks a subset 204 of feature columns and discrete values, such as column "age" and values "30," "35," "40," column "education" and values "Bachelor," "Master," "PhD," etc. Further details of the algorithms of feature selection performed by the counterfactual feature selection module 131 are described below in relation to FIGS. 5-7. For example, the counterfactual feature selection may employ a nearest neighbor search as described in Alg. 1 in FIG. 5.

Next, given the query instance 102 and its predicted label y (income <$50K/yr) and the selected counterfactual features 204, the counterfactual feature optimization module 132 determines which features in 204 are to be manipulated and what values to be set so that the predicted label of the modified instance x' is different from y.

Counterfactual feature optimization then determines the best feature value for each selected feature column, e.g., "Age=30, Education=Master, Working hours=45," etc. A batch of counterfactual examples 206 can then be constructed based on the optimized feature values. Further details of the algorithms of feature optimization performed by the counterfactual feature optimization module 131 are described below in relation to FIGS. 9-10. For example, the counterfactual feature optimization 132 may employ Alg. 4 in FIG. 9.

Given a set of counterfactual examples 206 generated from the counterfactual feature optimization 132, the counterfactual example selection 133 is configured to pick a set of diverse counterfactual examples such that the proximity of each counterfactual example is as high as possible (or the distance between each counterfactual example and the original query is as small as possible). Generating diverse counterfactual examples may help to get better understanding of machine learning prediction. The counterfactual example selection 133 may be implemented by Alg. 6 in FIG. 11, which includes a greedy algorithm to generate top k counterfactual examples based on proximity and diversity.

The continuous feature fine-tuning module 134 is then applied if one wants to optimize continuous proximity further to generate more actionable explanations. Specifically, one concern about discretizing continuous features is that the generated counterfactual examples may have better or more actionable values for those continuous features if they are optimized directly instead of being discretized via ordinal encoding. Therefore, the continuous feature fine-tuning module 134 may further optimize continuous counterfactual features to improve proximity. In one implementation, the continuous feature fine-tuning module 134 may implement Alg. 5 in FIG. 10B, e.g., a gradient-less descent (GLD) method for refining continuous counterfactual features.

Therefore, after continuous feature fine-tuning, the final counterfactual examples 208 may be generated, e.g., "age=25, work class=private, education=bachelor, work hours=42.5", etc.

Computer Environment

Figure 3:
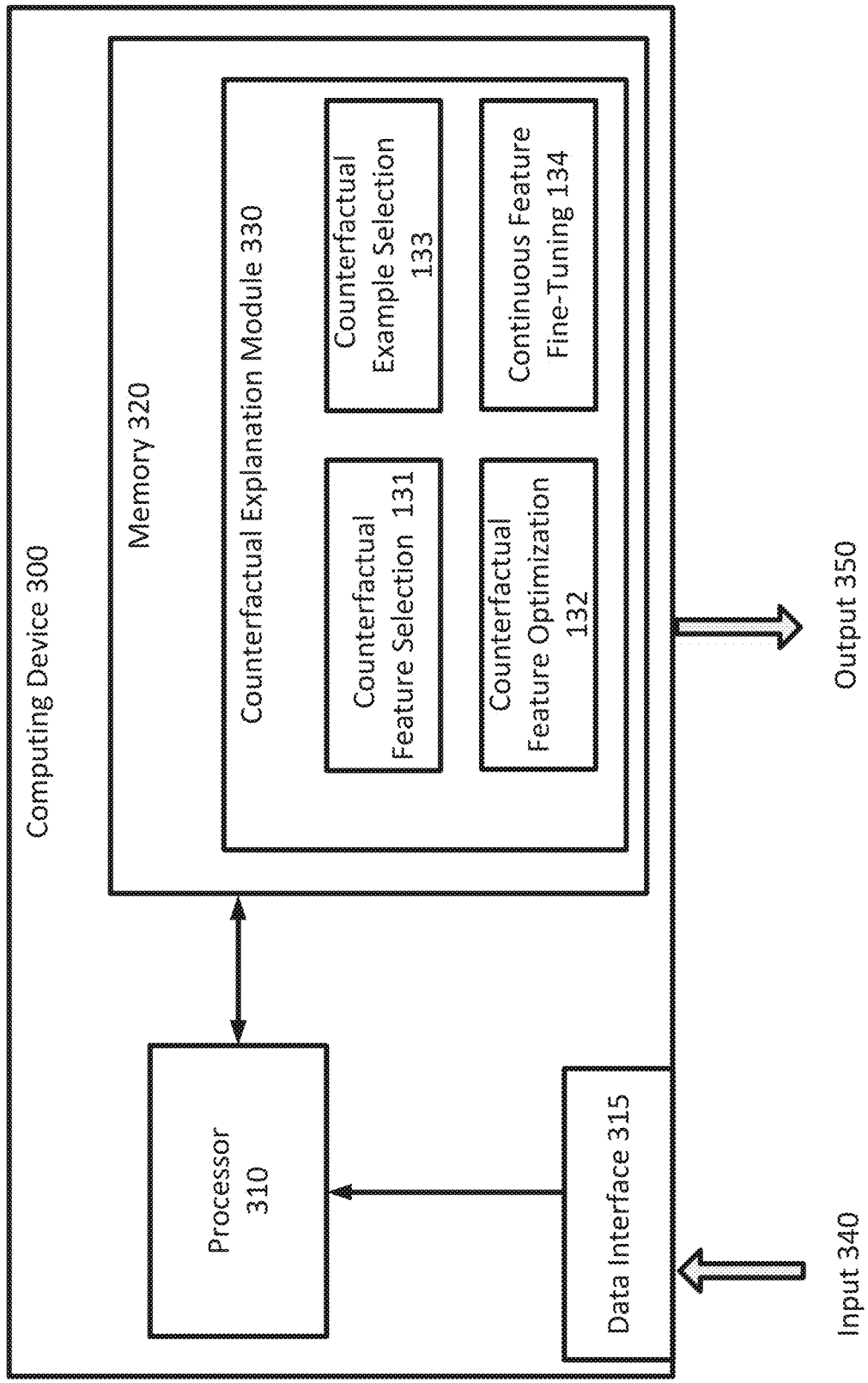
FIG. 3 is a simplified diagram of a computing device for generating counterfactual explanations, according to some embodiments.

FIG. 3 is a simplified diagram of a computing device for generating counterfactual explanations, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a counterfactual explanation module 330 that may be used to implement and/or emulate the systems and models, and/or to implement any of the methods described further herein. In some examples, the counterfactual explanation module 330, may receive an input 340, e.g., such as query instances, via a data interface 315. The data interface 315 may be any of a user interface that receives user query, or a communication interface that may receive or retrieve a previously stored query sample from the database. The counterfactual explanation module 330 may generate an output 350 such as counterfactual examples.

In some embodiments, the counterfactual explanation module 330 may further includes the counterfactual feature selection module 131, the counterfactual feature optimization module 132, the counterfactual example selection module 133 and the continuous feature fine-tuning module 134, which perform similar operations as described in relation to FIG. 2. In some examples, the counterfactual explanation module 330 and the sub-modules 131-134 may be implemented using hardware, software, and/or a combination of hardware and software. For instance, the counterfactual feature selection module 131 may include a structure shown at 800 in FIG. 8 and implement the algorithms and/or processes described in relation to FIG. 6-7. The counterfactual feature optimization 132 may implement the algorithms and/or processes described in relation to FIG. 9-10. The counterfactual example selection module 133 may implement the algorithm and/or process described in relation to FIG. 11. The continuous fine-tuning module 134 may implement the algorithm and/or process described in relation to FIG. 10B.

Example Embodiments of Counterfactual Example Generation

Figure 4:
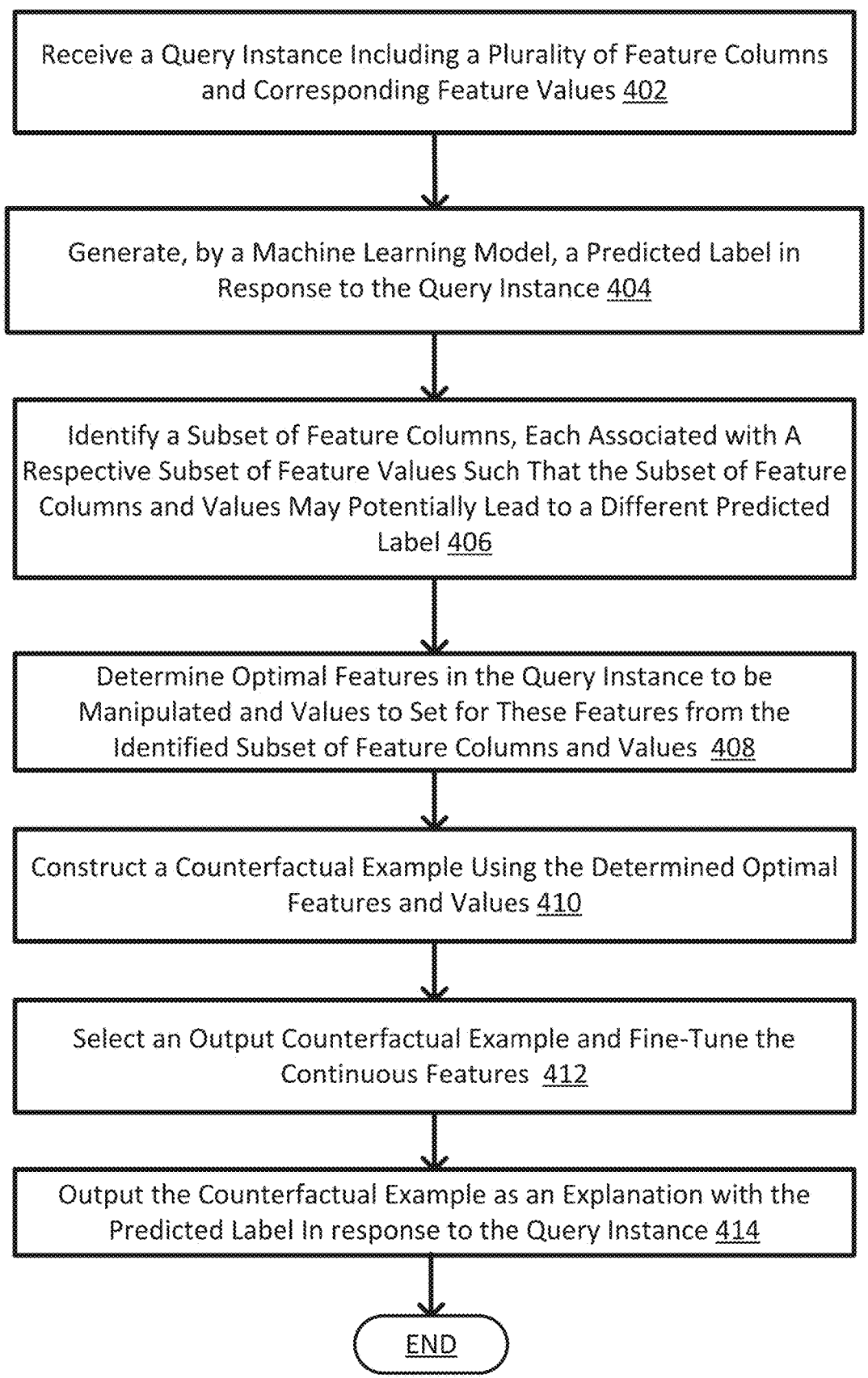
FIG. 4 provides an example logic flow diagram illustrating a method of counterfactual example generation, according to embodiments described herein.

FIG. 4 provides an example logic flow diagram illustrating a method of counterfactual example generation, according to embodiments described herein. One or more of the processes 402-414 of method 400 may be implemented, at least in part, in the form of executable code stored on non-transitory, tangible, machine-readable media that when run by one or more processors may cause the one or more processors to perform one or more of the processes 402-414. In some embodiments, method 400 may correspond to the method used by the module 330.

At process 402, a query instance (e.g., 102 in FIG. 2) may be received, e.g., via the data interface 315 in FIG. 3. The query instance may include a plurality of feature columns (e.g., "age," "working hours," "education," etc.) and corresponding feature values (e.g., age="20," working hours="30," etc.).

At process 404, a machine learning model (e.g., 110 in FIG. 1) may generate a predicted label in response to the query instance. For example, a predicted binary label of "not >$50K/yr" of predicted income level for the input query instance.

At process 406, a subset of feature columns, each associated with a respective subset of feature values may be identified such that the subset of feature columns and values may potentially lead to a different predicted label. For example, process 406 may be implemented by the counterfactual feature selection module 131 based on K-nearest neighbor search (as further described in relation to FIG. 5) or a recommendation model (as further described in relation to FIGS. 6-8).

At process 408, given the selected feature columns and feature values from process 406, optimal features in the query instance are determined to be manipulated and values are set for these features from the identified subset of feature columns and values. In this way, counterfactual examples are constructed based on the determined optimal features and values at process 410. Processes 408-410 may be performed by the counterfactual feature optimization module 132 using a reinforcement learning method, as further described in FIG. 9, or alternatively a gradient-less descent method, as further described in FIG. 10A. Counterfactual examples may be generated without the gradients of the machine learning model and thus may be applied to all kinds of classification models.

At process 412, the given the optimized counterfactual examples, a subset of counterfactual examples may be selected to provide proximity and diversity. For example, the selection may be performed via Alg. 6 in FIG. 11. The selected diverse counterfactual examples are then fine-tuned for continuous features, which may be performed via the GLD algorithm in FIG. 10B.

At process 414, the generated counterexample can be outputted with the predicted label as an explanation why the predicted label is generated in response to the specific query instance.

FIG. 5 provides an example pseudo-code segment illustrating an algorithm of the nearest neighbor search approach for generating counterfactual features, according to embodiments described herein. The data for training the machine learning model 110, e.g., a binary classifier, is divided into two classes according to the labels. At step (1) of Alg. 1, for each class label l, a search index, $tree_l$, is built for fast nearest neighbor search with the divided dataset associated with the label l, e.g., $\{x_i|y_i=1$ for $(x_i, y_i) \in \mathcal{D}\}$. The training dataset $\mathcal{D}$ can be either a subset of the examples or the whole examples for training the machine learning model 110.

At step (2) of Alg. 1, the counterfactual feature selection module 131 finds the K nearest neighbors of x in the different class label y'=1-y, using the search index $tree_{y'}$. Specifically, the distance metric applied here is the Euclidean distance. Note that the continuous features in the query instance x have been discretized into bins. One-hot encoding is applied for categorical features, while applying ordinal encoding for continuous features so that information of the closeness can be preserved, e.g., age of 20-25 is closer to 25-30 than 45-50.

At steps (3)-(6) of Alg. 1, the frequency of the changed feature columns and the frequency of the changed feature values in the K nearest neighbors compared to the original query instance x are computed.

At step (7) of Alg. 1, the counterfactual feature selection module 131 sorts the feature columns in descending order with respect to the computed frequency of the changed feature columns. Module 131 then selects the top s feature columns.

At step (8) of Alg. 1, module 131 sorts the elements in the changed values in descending order with respect to the computed frequency of the changed feature values. Module 131 then selects the top m values for each feature column.

At step (9) of Alg. 1, the selected top s feature columns, denoted by $\mathcal{C}$, and the selected top m feature values, denoted by $\mathcal{V}(\mathcal{C})$, are output by module 131 as the selected counterfactual features.

Alg. 1 can be implemented efficiently to generate at most s×m candidate features. Alg. 1 also allows users to specify actionable feature columns or the columns they care about most. In this way, before constructing the search index, instead of considering all the features in x, module 131 only concerns a subset of the features specified the users and builds a search index based on this subset, which largely reduces computational cost.

FIG. 6 provides an example pseudo-code segment illustrating an algorithm of building a recommendation model for generating counterfactual features, according to embodiments described herein. Alg. 2 shown in FIG. 6 illustrates an alternative approach of generating counterfactual features based on a recommendation model. Specifically, as the objective of module 131 is to choose several features that potentially change the predicted label, this problem can be rephrased as a recommendation problem, i.e., given an input x with d different features and predicted label y, the recommendation model is trained to recommend: (1) k feature columns such that varying the values in these features can potentially change the predicted label from y to y'=1-y; and (2) m candidate values for each feature selected in the previous step such that setting to these values can potentially flip the predicted label.

Thus, given the machine learning model 110, e.g., a classifier f (·), and the training data $\mathcal{D}$ another machine learning model g(·) may be trained to perform this recommendation task. Alg. 2 shows an example method of construct a training dataset for the counterfactual feature recommendation task in order to design the machine learning model g ( ) for it with high recommendation accuracy.

At step (1) of Alg. 2, for each query instance $x_i \in \mathcal{D}$, a predicted label $f(x_i)$ is generated to result in set $X = \{(x_i, f(x_i))$ for $i = \{1, \ldots, n\}$. As the counterfactual explanation is based on the trained classifier f (·), the data used to build the training dataset is the classifier's prediction results X.

At step (2) of Alg. 2, for each class label l, a search index, $tree_l$, is built for fast nearest neighbor search with the divided dataset associated with the label l, e.g., $\{x_i|y_i=l$ for $(x_i,y_i) \in X\}$.

At steps (3)-(4) of Alg. 2, for each instance $(x_i, y_i)$ in X, the K nearest neighbors, denoted as set Z of xi in the class with label $1-y_i$ are found, e.g., via the search index $tree_{1-yi}$.

At step (5) of Alg. 2, from Z, the feature columns c and feature values v that are different from those in xi into the dataset R, which is the training dataset for the recommendation model.

Thus, for (x, y, c, v)∈R, the goal of the recommendation model is to predict feature column c and feature value v given instance x and its predicted label y. Note that there may exist some duplicate instances in R, i.e., the same (x, y, c, v)∈R may appear multiple times. The duplicate instances do not need to be removed since if an instance (x, y, c, v) appear repeatedly, it is probable that (c, v) are candidate features for x, which is equivalent to impose more weights on this instance during training the recommendation model.

FIG. 7 provides an example pseudo-code segment illustrating an algorithm of generating counterfactual feature selections based on a recommendation model, according to embodiments described herein. Given the training dataset R generated by Alg. 2 in FIG. 6, assume there are r instances in R, i.e., $R=\{(x_i, y_i, c_i, v_i)|_{i=1}^r\}$.

At step (1) of Alg. (3), the recommendation model takes $(x_i, y_i)$ as the inputs and generates: 1) the probability $P \in \mathbb{R}^d$ for feature column selection, e.g., a feature column with a higher probability means that changing its value may more likely flip the predicted label, and 2) the probabilities $\{Q(c) \in \mathbb{R}^{n_c}|_{c=1}^d\}$ for feature value selection for each feature column where $n_c$ is the number of the candidate values for feature column c, e.g., for feature column c, a feature value v with a higher probability indicated by Q(c) means that setting the value of c to v may more likely flip the predicted label.

At step (2) of Alg. 3, the probabilities P are sorted in descending order, and the top s feature columns with the highest probabilities are selected, denoted by set C.

At step (3) of Alg. 3, for each column $c \in C$, the probabilities Q(c) are sorted in descending order and the top m feature values are selected, denoted by V(c).

At step (4) of Alg. 3, the set of feature columns C and corresponding set of feature values V(C) are returned as the selected counterfactual features.

Compared with Alg. 1 in FIG. 5, Alg. 3 only generates s×m candidate features instead of d×m in the worst case. When s is much smaller than d, Alg. 3 may significantly reduce the search space for finding counterfactual examples.

Figure 8:
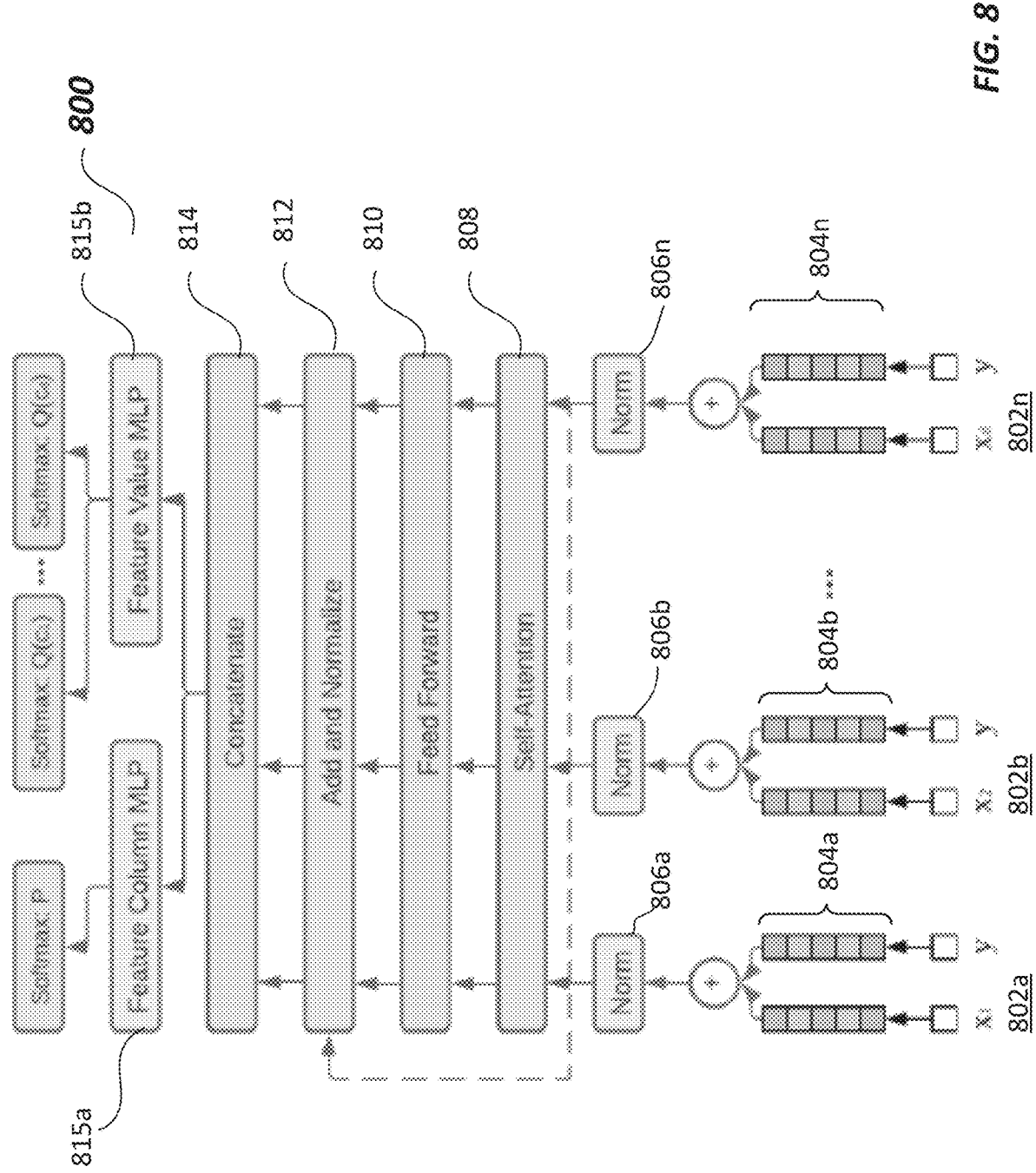
FIG. 8 shows a simplified diagram illustrating the neural network model structure of a recommendation model for feature selection, according to embodiments described herein.

FIG. 8 shows a simplified diagram 800 illustrating the neural network model structure of a recommendation model for feature selection, according to embodiments described herein. Diagram 800 shows that any continuous features in query instance x are discretized into xi, ..., xd before feeding into the network. For example, each feature and the predicted label 802a-n are converted into a low-dimensional and dense real-valued embedding vectors 804a-n. Then the two embeddings 804a-n are added together and followed by layer normalization 806a-n, respectively. To model the correlation between different features, a transformer layer comprising a self-attention sublayer 808, a feed-forward sublayer 810 and a normalization layer 812.

The output hidden states of the transformer layer are then concatenated at module 814 together and then fed into two multi-layer perceptrons (MLPs) 815a-b, i.e., one for feature column selection and the other one for feature value selection. Each MLP 815a or 815b then outputs to its respective softmax module(s) to generate the respective probabilities, P or Q(c), as described in Alg. 3 in FIG. 7.

In one embodiment, the model shown at diagram 800 may have multiple transformer layers for modeling hidden feature representations.

FIG. 9 provides an example pseudo-code segment illustrating an algorithm of RL-based counterfactual feature optimization for generating a counterfactual example given selected counterfactual features, according to embodiments described herein. The counterfactual feature optimization problem can be formulated as a reinforcement learning problem. Specifically, suppose that $C=\{c_1, \cdot, c_s\}$ and $V(c_i)$ $\{v_1, \cdot, v_m\}$ for $i=1, \cdot, s$. The reinforcement learning environment is defined by the classifier $f(\cdot)$, the instance (x, y), the candidate features C and V(C). The action is defined by the feature columns and values to be modified in order to construct the counterfactual example x'. The state is x' by taking an action on x. The reward function is the prediction score of label y'=1-y. For each round t, an action at is taken to construct $x_t'$ and then the environment sends the feedback reward $r_t=f_{1-u}(x_t')$. Let $\pi_\theta(\cdot)$ be a stochastic policy for selecting actions parameterized by $\theta$. Then the objective is to find the optimal policy that maximizes the cumulative reward:

$$\max_\theta J(\theta) := \mathbb{E}_{\pi\theta}\left[\sum_{t=1}^T r_t\right], \quad (1)$$

s.t. # of select features by $\pi_\theta \leq w$ where w denotes a sparsity constraint on the policy $\pi_\theta$ such that the number of the selected feature columns to modify cannot be larger than constant w.

The policy TEO may be formulated as follows. Let $\mu=(\mu_1, \cdot, \mu_s) \in \{0, 1\}^s$ be a random vector whose ith element indicates whether the ith feature column is selected or not, e.g., $\mu_i=1$ means it is selected, and P be the probability distribution of $\mu$. For each $c \in C$, let $v_c \in \{1, \cdot, m\}$ be a random variable indicating which feature value is selected for the cth feature, v be the random vector (v1, ..., vc) and Qc be the probability distribution of $v_c$. Conditioned on $\mu$, $v_1, \cdot, v_c$ are independent from each other. Now that constructing counterfactual example x' involves two steps, i.e., one step for selecting features to modify and the other step for picking the value for the selected features. Thus, the step to select the value of feature c only depends on c without depending on other features.

An action can be represented by $\mu$ and v, e.g., $a=\{(\mu_1=1, v_1=2), (\mu_2=0, v_2=None), (\mu_3=1, v_3=1)\}$, meaning that the first and third features are set to values 2 and 1, respectively. Then policy $\pi_\theta$ can be defined by:

$$\pi\theta(a) = \mathcal{P}(\mu)\Pi_{c=1}^s Q_c(v_c)^{1[\mu_c=1]} \quad (2)$$

where $1[\cdot]$ is the indicator function which equals 1 if the condition is met or 0 otherwise. P is constructed by s independent Bernoulli distribution parameterized by $p_c$ and Qc is defined by the softmax function parameterized by q c $\in \mathbb{R}^m$, namely:

$$\mathcal{P}(\mu) = \prod_{c=1}^s \text{Bernoulli}(p_c, \mu_c), Q_c(v) = \frac{e^{q_{c,v}}}{\sum_{i=1}^m e^{q_{c,i}}} \quad (3)$$

where $q_{c,i}$ is the ith element of $q_c$, then $\theta=(p_1, \cdot, p_s, q_1, \ldots, q_s)$. Under this assumption, the sparsity constraint w is equivalent to $\|p\|_0 \leq w$ where $p=(p_1, \cdot, p_s)$ and $\|\cdot\|_0$ is the number of nonzero elements. Therefore, the optimization problem (1) can be reformulated as:

$$\max_\theta \mathbb{E}_{\pi\theta}\left[\sum_{t=1}^T r_t\right], \text{s.t. } \|p\|_0 \leq w \quad (4)$$

where the policy $\pi_\theta$ is defined by (2).

As the optimization problem with $l_0$-norm constraint may be difficult to compute, a relaxed form of the optimization problem may be obtained:

$$\min_\theta -\mathbb{E}_{\pi\theta}\left[\sum_{t=1}^T r_t\right] + \lambda_1 \|p\|_1 + \lambda_2 \sum_{c=1}^s p_c \log p_c \quad (5)$$

where $\lambda_1$ and $\lambda_2$ are constants. The first regularization term $\|p\|_1$ is used to encourage sparse solutions and the second regularization term is the probability entropy that encourages doing exploration during minimization via policy gradient.

In step (1) of Alg. 4 shown in FIG. 9, the relaxed problem shown in Eq. (5) is solved by finding the optimal policy $\pi_{\theta^*}$, e.g., $\theta^* = (p^*_1, \cdot, p^*_s, q^*_1, \cdot, q^*_s)$, via the REINFORCE algorithm. Further details of the REINFORCE algorithm can be found in [33, 36], which are hereby expressly incorporated by reference herein in their entirety.

At step (2) of Alg. 4, the obtained $(p^*_1, \cdot, p^*_s)$ are sorted in descending order. The top w features with the highest values of $p^*$ may be selected, where w is the upper bound of sparsity. The set of selected features is denoted by $C^*$.

At step (3) of Alg. 4, for each selected feature c in $C^*$, the top feature value $v_c^*$ with the highest value of $q_c$ is selected.

At step (4) of Alg. 4, the set of the selected features and the selected feature values $\mathcal{F}^* = \{(c, v_c^*)|c \in C^*\}$ is sorted in descending order according to the corresponding $p_c^*$.

At step (5) of Alg. 4, a greedy method is applied to construct counterfactual examples. For example, for every (c, v) in the set sorted set $\mathcal{F}^*$, set x'[c]=v, and if $f_{1-y}(x') > 0.5$, the counterfactual example x' and the optimal features $\mathcal{F}^*$ are returned.

At steps (6)-(7) of Alg. 4, actions are sampled based on the optimal policy $\pi_\theta^*$, and a batch of counterfactual examples are generated. The generated counterfactual examples are thus provided.

In this way, in addition to the generated counterfactual examples x', the selected features (and values) set $\mathcal{F}^*$ can also be utilized for providing an explanation that provides the counterfactual feature values for each feature in $C^*$.

In addition, if the definitions of $\mathcal{P}$ and $Q_c$ in Eq. (3) is generalized as follows:

$$\mathcal{P}(\mu) = \Pi_{c=1}^{s} 1[p_c = \mu_c], Q_c(v) = 1[q_{c,v} = 1] \quad (6)$$

Given the instance (x, y) to explain and the domains defined by C and V(C) generated from counterfactual feature selection, the counterfactual example $x^*$ constructed by the optimal policy from Eq. (4) with $\pi_\theta$ defined by Eq. (2) and Eq. (6) is also an optimal solution of the following optimization problem:

$$\max_{x'} f_{1-y}(x'), \text{ s.t. } \|x' - x\|_0 \leq w \quad (7)$$

Therefore, while optimizing Eq. (4) with $\mathcal{P}$ and $Q_c$ defined by Eq. (6) can be NP hard, a relaxation by replacing Eq. (6) with its "soft" formulation Eq. (3) can be done. This means that Alg. 4 that solves Eq. (5) actually approximately solves Eq. (7).

FIG. 10A provides an example pseudo-code segment illustrating an algorithm of GLD-based counterfactual feature optimization for generating a counterfactual example given selected counterfactual features, according to embodiments described herein. A relaxation of the optimization problem (7) by moving the constraint into the objective function is given as follows:

$$\min_{x'} -\lambda f_{1-y}(x') + \frac{1}{d}\|x' - x\|_0 \quad (8)$$

where x is the query instance, y is its corresponding label, d is the number of the features and $\lambda > 0$ is the regularization weight. Thus, the counterfactual feature optimization module 132 is configured to find the counterfactual example x' which minimizes Eq. (8).

Thus, given $C = \{c_1, \cdot, c_s\}$ and $V(c_i) = \{v_1, \cdot, v_m\}$ for $i = 1, \cdot, s$ selected from the previous step, define $\mu \in \mathbb{R}_s$ and $v_i \in \mathbb{R}^m$ for $i = 1, \cdot, s$ such that $x' = g(x, \mu, v_1, \cdot, v_s)$ where g satisfies $$x'[c_i] = \begin{cases} x'[c_i] & \text{if } \mu[i] \leq 0.5; \\ v_j \text{ where } j = \text{argmax}_k v_i[k] & \text{otherwise.} \end{cases}$$

In other words, x' is constructed by the values of $\{\mu, v1, \ldots, vs\}$, namely, for each index $i = 1, \ldots, s$ and the corresponding feature column $c_i \in C$, $\mu[i] \leq 0.5$ means "without modifying this feature", i.e., x'[ci] is set to $x[c_i]$, while $\mu[i] > 0.5$ means "modifying this feature", i.e., $x'[c_i]$ is set to $v_j \in V(c_i)$ whose index j has the highest value among the values in $v_i$. Then Problem (8) can be reformulated as $$\min_{\mu, v_1, \ldots, v_s} -\lambda f_{1-y}(g(x, \mu, v_1, \ldots, v_s)) + \frac{1}{d}\|1[\mu > 0.5]\|_0. \quad (9)$$

Alg. 5 in FIG. 10 solves the optimization problem (9). Specifically, at step (1) of Alg. 5, an inner loop limit K is set to be K=log (R/r) where R denotes the maximum search radius, and r denotes the minimum search radius.

At steps (4)-(8) of Alg. 5, the loop 1001 computes the set $\mathcal{T}_t$ by adding computed $(x'_k, \mu_k, v_{1,k}, \ldots, v_{s,k})$ if $f_{1-y}(x'_k) > 0.5$ for $k = 1, \ldots, K$. At the current time step t, the resulting x', $\mu, v_1, \ldots, v_s$ is stored be the best solution of Eq. (9) in $\mathcal{T}_t$.

At steps (3)-(10) of Alg. 5, the loop 1002 repeats the loop 1001 for all time steps $t = 1, \ldots, T$. More sparse solutions are obtained, i.e., if $\mu[i]$ switches on ($\mu[i] > 0.5$), $\mu[i]$ is reset to a number slightly larger than 0.5, e.g., 0.55, making that it has a higher chance to switch off ($\mu[i] \leq 0.5$) in the next loop.

At steps (2)-(11) of Alg. 5, the loop 1003 repeats the loop 1002 for all training epochs. Then the counterfactual example x' is selected as the one that minimizes Eq. (8).

The RL-based method (Alg. 4 in FIG. 9) and GLD method (Alg. 5 in FIG. 10) may also be applied to explain multivariate time series classification. Specifically, given a query instance $x \in \mathbb{R}^{d \times t}$ (d time series of length t), a classifier f (·) and a desired label y', the goal is to find a counterfactual example x' constructed by the substitutions of entire time series from a distractor sample $\tilde{x}$ chosen from the training dataset to x, and to minimize the number of substitutions, i.e., $\min_C -\lambda f_{y'}(x') + |C|/d$, where x'[i, :] equals $\tilde{x}[i, :]$ if $i \in C$ or x[i, :] otherwise. The distractor sample $\tilde{x}$ may be found by the nearest neighbor search method discussed at Alg. 1 of FIG. 5, with number of nearest neighbors K=1 and number of selected values m=1. Then for determining which time series to be substituted, RL-based method or GLD method may be applied by only considering feature column selection, i.e., optimizing $\mu$, because there is only one candidate value for each feature.

Alternatively, FIG. 10B provides an example pseudo-code segment illustrating the GLD method for continuous feature fine-tuning at module 133, according to embodiments described herein.

Given a counterfactual example x' generated by the previous stage, let C be the set of the continuous features such that $x'[i] \neq x[i]$ for each $i \in C$, i.e., the set of the continuous features that are modified to construct x'. Without loss of generality, assume that the value of each continuous feature lies in [0, 1]. The goal is to optimize the values x'[i] for $i \in C$ such that the new counterfactual example $\hat{x}$ satisfies $f_{1-y}(\hat{x}) > 0.5$ d the difference between $\hat{x}$ and x on the continuous features, i.e. $\Sigma_{i \in C}|\hat{x}[i] - x[i]|$, is as small as possible. Thus another form of the Eq. (8) can be represented as:

$$\min_z \frac{1}{|C|} \sum_{i \in C} |z[i] - x[i]|,$$

s.t. $f_{1-y}(z) > 0.5$, $z[i] = x'[i] \forall i \notin C$, $z[i] \in [0, 1]$, $\forall i \in C$.

This alternate form of Eq. (8) can be approximately solved via Alg. 5 in FIG. 10B, which is an adapted form of FIG. 10A for continuous feature fine-tuning.

FIG. 11 provides an example pseudo-code segment illustrating an algorithm of generating diverse counterfactual examples for counterfactual example selection, according to embodiments described herein. Diverse counterfactual examples may help to get better understanding of machine learning prediction. In one implementation, Alg. 6 shown in FIG. 11 provides a simplified algorithm for generating diverse counterfactual examples with the RL-based (Alg. 4 in FIG. 9) and GLD (Alg. 5 in FIG. 10) methods.

In another implementation, Alg. 6 may be applied for selecting counterfactual examples by module 133.

At step (1a) or (1b) of Alg. 6, a set of counterfactual examples E is constructed. For example, for the RL-based method shown in Alg. 4 in FIG. 9, set E may be constructed by the optimal policy, i.e., by sampling an action via the optimal policy, constructing the corresponding counterfactual example x', and adding x' into ε if f (x') >0.5. For the GLD method shown in Alg. 5 in FIG. 10, set ε is the union of $\mathcal{T}_t$ constructed at each step t.

At step (2) of Alg. 6, the examples in set E are sorted in ascending order based on the value $-\lambda f_{1-y}(x') + \|x' - x\|_0/d$, i.e., the objective function in Eq. (8). This function makes a trade-off between the sparsity and the prediction score for the desired label 1-y.

In another example, the examples in set ε are sorted in descending order based on the sum of categorical proximity and continuous proximity, e.g., Proximity=$-\|x'_{cat} - x_{cat}\|_0 - \|(x'_{con} - x_{con})/m_{con}\|_1$, where $x_{cat}$ and $x_{con}$ are the categorical and continuous features respectively, and $m_{con}$ is the media of $x_{con}$ over the training data.

At steps (3)-(5) of Alg. 6, "duplicate" examples from the sorted set are removed in a greedy manner to make the counterfactual feature columns (their feature values are different from x) of the selected examples less overlapped with each other. Specifically, at step (4), for each example x' in the sorted set, let D(x') be the set of the features in x' that are different from x. At step (5), if there exists any feature in D(x') also belonging to more than K sets D(z) where z is ranked higher than x' in the sorted set, then example x' is skipped. Otherwise, if no more than K sets D(z) where z is ranked higher than x' in the sorted set, x' is added to the diverse set.

Thus, at step (6) of Alg. 6, after each x' in the sorted set has been iterated, the diverse set is returned.

Example Performance

FIGS. 12-27 provide example data tables illustrating data experiment results of the counterfactual example generation, according to one embodiment. Five tabular datasets and one time series classification dataset are used for running data experiments to evaluate the counterfactual example generation module described herein.

Dataset Adult Income is used to predict whether income exceeds $50K/yr based on census income data and is available on the UCI machine learning repository. 8 features, namely, age, working hours, work class, education, marital status, occupation, race and gender are extracted. After data cleaning, the dataset has 32561 instances.

Breast Cancer dataset is the "Breast Cancer Wisconsin (Original) Dataset" described in Mangasarian et al., Breast Cancer Diagnosis and Prognosis Via Linear Programming. Operations Research 43, 4 (1995), pp. 570-577, 1995. There are 699 instances and each instance has 9 features, e.g., clump thickness, uniformity of cell size, uniformity of cell shape. The task is to classify whether an instance is malignant or benign.

COMPAS dataset contains 6172 instances. 6 features, i.e., number of priors, score factor, misdemeanor, gender, age and race are extracted. The task is to predict which of the bail applicants will recidivate in the next two years.

Australian Credit dataset concerns credit card applications, which has 690 instances, of which each consists of 14 features (6 continuous features and 8 categorical features) and 1 class label that quantifies the approval decision. The task is to predict if the credit application was approved or rejected to a particular customer.

Titanic dataset is used to predict which passengers survived the Titanic shipwreck. It has 891 instances after data cleaning. 7 features, namely, age, fare, ticket class, sex, sibsp (number of sib-lings/spouses aboard), parch (number of parents/children aboard), embarked are extracted.

Taxonomist dataset contains runs of 11 different applications with various input sets and configurations. The goal is to classify the different applications. It has 4728 samples and each sample has 563 time series.

Each dataset is divided into 80% training and 20% test data for evaluating machine learning classifiers. Three popularly used classifiers, an XGBoost model and a MLP model for tabular classification, and a random forest model for time series classification. The categorical features are converted into one-hot encoding and the continuous features are scaled between 0 and 1. The hidden layer sizes and the activation function for MLP is ReLU, respectively. The max depth for XGBoost is 8. The number of estimators for random forest is 20.

For Algorithm 1, the number of the nearest neighbors K is set to 30, the number of selected feature columns s is set to 8 and the number of the selected values for each feature m is set to 3. Counterfactual feature optimization is performed via the REINFORCE algorithm. ADAM (Kingma et al., Adam: A Method for Stochastic Optimization, arXiv: cs.LG/1412.6980, 2017) is used as the optimizer with learning rate 0.1, batch size 40 and 15 epochs. In order to make the REINFORCE algorithm stable, the reward function used here is $r = f_{1-y}(x') - b$ where b is the median value of $f_{1-y}(\cdot)$ in one batch instead of $r = f_{1-y}(x')$ for variance reduction. The regularization weights $\lambda_1$ and $\lambda_2$ are set to 2. For RL-method, the sparsity parameter w is set to 6. For GLD method, E=3, T=20, R=0.25, r=0.0005 and A=0.1, which works well for all the experiments.

The following approaches are used as baseline for generating counterfactual examples in the experiments:

Greedy denotes the sequential greedy method proposed in Ates et al., Counter-factual Explanations for Machine Learning on Multivariate Time Series Data, arXiv:cs.LG/2008.10781. Given the candidate counterfactual features selected from nearest neighbor search (Algorithm 1), the greedy method modifies the features in x sequentially until the predicted label flips.

A SHAP-value based method is proposed in Rathi, Generating Counterfactual and Contrastive Explanations using SHAP. arXiv:cs.LG/1906.09293. It first computes the SHAP values for all the features in x and then constructs counterfactual examples by changing the features whose SHAP values of the desired class y'=1-y are negative.

DiCE method is proposed in Mothilal et al., Explaining Machine Learning Classifiers through Diverse Counterfactual Explanations. In Proceedings of the 2020 Conference on Fairness, Accountability, and Transparency, Association for Computing Machinery, pp. 607-617, and Rathi 2019.

CERTIFAI is a custom genetic algorithm to generate counterfactuals proposed by Sharma et al., CERTIFAI: A Common Framework to Provide Explanations and Analyse the Fairness and Robustness of Black-Box Models, in Proceedings of the AAAI/ACM Conference on AI, Ethics, and Society, pp. 166-172, 2020. It is a model-agnostic method and can be applied to black-box classification models.

Foil Trees is proposed by Waa et al., Contrastive Explanations with Local Foil Trees, arXiv:stat.ML/1806.07470, 2018, utilizing locally trained one-versus-all decision trees to identify the disjoint set of rules that causes the tree to classify data points as the foil and not as the fact.

The RL and GLD methods described in FIGS. 9-10 are applied. The candidate counterfactual features are generated by Algorithm 1.

To evaluate the methods for generating counterfactual examples, the validity, sparsity and diversity metrics as well as the prediction scores for desired classes. Validity is the fraction of examples returned by a method that are valid counterfactuals, e.g., $f_{1-y}(x') > 0.5$. Sparsity indicates the number of changes between the original input x and a generated counterfactual example x'. Diversity measures the fraction of features that are different between any two pair of counterfactual examples (e.g., generate K counterfactuals per query instance). For sparsity, the lower the better. For validity, diversity and prediction scores, the higher the better.

Table 1 in FIG. 12 and Table 2 in FIG. 13 demonstrate the validity and sparsity for Greedy, SHAP-based, CERTIFAI, Foil Trees, the RL and GLD with the XGBoost classifier. DiCE is not included here because it is hard to handle the XGBoost classifier. The RL and GLD methods have the highest validity. RL obtains the lowest sparsity for all the datasets except "Adult" compared with other approaches, and GLD has the lowest sparsity for "Adult". Note that the validity of Foil Trees is quite low compared with other methods and it fails for "Breast" and "Credit". Table 3 in FIG. 14 shows that the RL method achieves the highest prediction scores of the desired labels, meaning that the counterfacutals generated by it are closer to the desired classes.

Table 4 in FIG. 15 and Table 5 in FIG. 16 demonstrate the validity and sparsity for Greedy, SHAP-based, CERTIFAI, DiCE, Foil Trees, RL and GLD with the MLP classifier. DiCE, the RL and GLD are able to find valid counterfactual examples for all the test instances, outperforming the other approaches. But in terms of sparsity, DiCE has much larger sparsity than the proposed methods, e.g., 2.93 for "Adult" and 2.10 for "COMPAS", while RL/GLD achieves 1.47/1.50 for "Adult" and 1.43/1.49 for "COMPAS". For "Credit" and "Titanic", Greedy, SHAP-based and RL/GLD have similar performance with the MLP classifier, which is different from that with the XGBoost classifier. Running time per query for all these methods as shown in Table 7 of FIG. 18. The Foil Trees method is fastest but it obtains the worst performance. DiCE is the slowest method which takes about 3 seconds per query, making it impractical for real applications. RL/GLD methods achieve comparable speed as Greedy and SHAP-based while obtaining better performance in terms of validity, sparsity and prediction scores.

Tables 8 in FIG. 19 and Table 9 in FIG. 20 give several counterfactual examples generated by the counterfactual example generation approach described herein. For the Adult dataset, the counterfactual examples show that studying for an advanced degree or spending more time at work can lead to a higher income. It also shows a less obvious counterfactual example such as getting married for a higher income. This kind of counterfactual example is generated due to correlations in the dataset that married people having a higher income. For the Titanic dataset, the results show that the persons who are female or have higher ticket classes have a bigger chance to survive from the disaster.

Besides the counterfactual examples, the proposed approach can also take counterfactual features extracted from the policy learned by RL method as the explanation to explore "what-if" scenarios, which cannot be easily achieved by other approaches. In Table 8 and Table 9, the top-4 selected feature columns and top-1 feature values are listed for each example. For the first example in Table 8, these counterfactual features "Education→Doctorate, Working hours→37.5, Workclass→Private, Occupation→Professional" are obtained, meaning that he/she will have a higher income if he/she has a higher degree, longer working hours and a more professional occupation. For the first example in Table 9, "Sex→female, Ticket class→1, Embarked→C, SibSp→0" is obtained, which means gender being female or having a higher class or having no siblings/spouses leads to a bigger survival chance. These counterfactual explanations help detect bias in the dataset which may reflect some bias in our society under certain scenarios. For example, women were more likely to survive because society's values dictate that women and children should be saved first. And rich passengers were more likely to survive because they had rooms on the higher classes of the ship so that they may have the privilege to get to the boats more easily.

Figure 21:
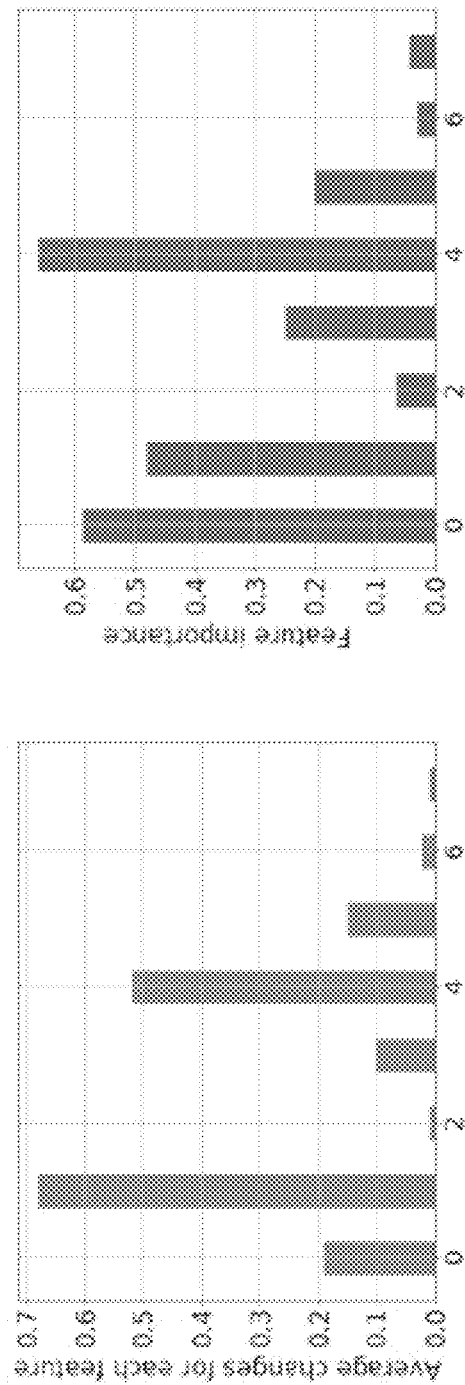

Additional experiment computes the average number of the changes for each feature to construct counterfactual example x' and compare it with the feature importance of the original input x. The feature importance is computed by taking the average of the SHAP values of the samples in the test dataset. FIG. 21 shows this comparison in the Adult dataset where features 0 to 7 are "Age", "Education", "Gender", "Working hours", "Marital", "Occupation", "Race" and "Workclass", respectively. Clearly, the average feature changes are consistent with the feature importance, e.g., "Age", "Education" and "Marital" are more important, and "Gender", "Race" and "Workclass" are less important.

This experiment compares CERTIFAI, DiCE, the RL and GLD for generating diverse counterfactual examples per query instance. Algorithm 6 is applied for the RL and GLD. Since Greedy, SHAP-based and Foil trees cannot generate diverse counterfactuals, they are not compared here. Table 12 in FIG. 24 and Table 13 in FIG. 25 show the sparsity and diversity metrics. The RL and GLD methods obtain the lowest sparsity while DiCE achieves the highest diversity. Table 14 in FIG. 26 gives the running time for these methods. DiCE is much slower than CERTIFAI and the proposed methods. The proposed methods make a good trade-off between sparsity and diversity with much less running time per query. For practical applications, we can apply RL or GLD or both as ensemble. Table 10 in FIG. 22 and Table 11 in FIG. 23 give diverse counterfactual examples generated by the RL method, generating diverse explanations for the query instances.

Additional experiment demonstrates that the proposed methods herein can also be applied to time series classification problems. The experiment is conducted on the Taxonomist dataset, where the query label is "ft" and we take the other labels as the desired labels and generate counterfactual examples for all the desired labels. The counterfactual examples are constructed by several time series (features), which is compared with Greedy since the other methods cannot handle time series data directly. Table 15 in FIG. 27 shows the sparsity and the running time for these methods, which shows that the proposed methods are more than 10 times faster than Greedy while achieve similar sparsity metrics for different setups. This result also shows that the proposed methods can handle high dimensional data efficiently.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating a counterfactual example for counterfactual explanation in a machine learning model, the method comprising:
receiving a query instance including a plurality of feature columns and corresponding feature values;
generating, by a machine learning model, a prediction result in response to the query instance;
identifying, from the plurality feature columns, a subset of feature columns associated with corresponding alternative feature values that would have potentially changed the prediction result;
determining an optimal policy that maximizes an expected feedback reward earned for modifying the query instance including changing a feature value of at least one feature column of the subset of feature columns;
determining a number of feature columns of the subset of feature columns and a number of associated feature values according to the determined optimal policy;
constructing a counterfactual example using a portion of the determined number of feature columns and the number of associated feature values; and
outputting, by the machine learning model, the counterfactual example as a counterfactual explanation for the prediction result in response to the query instance, wherein the optimal policy is determined by reinforcement learning (RL) in which:
changing the feature value of the at least one feature column is treated as an action in the RL;
the modified query instance is treated as a state in the RL; and
a reward function of the RL for determining the expected feedback reward is a prediction score of a different label other than the prediction result.

2. The method of claim 1, wherein the optimal policy is determined subject to a sparsity constraint for selecting the action.

3. The method of claim 2, wherein the sparsity constraint is imposed via a probability distribution parameterized by parameters of the machine learning model.

4. The method of claim 1, wherein the optimal policy is determined by a gradientless descent procedure that encourages a sparse solution for selecting the action and a gradient descent procedure that encourages an exploration solution for selecting the action.

5. The method of claim 1, wherein:
the counterfactual example is a first counterfactual example; and
the constructing comprises constructing a diverse set of counterfactual examples including the first counterfactual example and a second counterfactual example using at least one feature column different from the portion of the determined number of feature columns.

6. The method of claim 5, further comprising:
sorting the set of counterfactual examples based on respective objective function values; and
removing duplicate counterfactual examples from the set of counterfactual examples.

7. The method of claim 1, wherein the machine learning model is a multivariate time series classifier that receives the query instance of a time series of input sequences.

8. The method of claim 1, wherein the subset of feature columns are identified from a number of nearest neighboring query instances to the query instance via a nearest neighbor search tree built from a training dataset.

9. A system for generating a counterfactual example for counterfactual explanation in a machine learning model, the system comprising:
a memory that stores the machine learning model;
a data interface that receives a query instance including a plurality of feature columns and corresponding feature values; and
a processor that reads instructions from the memory to perform:
generating, by the machine learning model, a prediction result in response to the query instance;
identifying, from the plurality feature columns, a subset of feature columns associated with corresponding alternative feature values that would have potentially changed the prediction result;
determining an optimal policy that maximizes an expected feedback reward earned for modifying the query instance including changing a feature value of at least one feature column of the subset of feature columns;
determining a number of feature columns of the subset of feature columns and a number of associated feature values according to the determined optimal policy;
constructing a counterfactual example using a portion of the determined number of feature columns and the number of associated feature values; and
outputting, by the machine learning model, the counterfactual example as a counterfactual explanation for the prediction result in response to the query instance, wherein the optimal policy is determined by reinforcement learning (RL) in which:
changing the feature value of the at least one feature column is treated as an action in the RL;
the modified query instance is treated as a state in the RL; and
a reward function of the RL for determining the expected feedback reward is a prediction score of a different label other than the prediction result.

10. The system of claim 9, wherein the optimal policy is determined subject to a sparsity constraint that is imposed on a stochastic policy for selecting the action.

11. The system of claim 10, wherein the sparsity constraint is imposed via a probability distribution parameterized by parameters of the machine learning model.

12. The system of claim 9, wherein the optimal policy is determined by a gradientless descent procedure that encourages a sparse solution for selecting the action and a gradient descent procedure that encourages an exploration solution for selecting the action.

13. The system of claim 9, wherein the counterfactual example is a first counterfactual example and the processor further reads instructions from the memory to:
construct a diverse set of counterfactual examples including the first counterfactual example and a second counterfactual example using at least one feature column different from the portion of the determined number of feature columns.

14. The system of claim 13, wherein the processor further reads instructions from the memory to perform:
sorting the set of counterfactual examples based on respective objective function values; and
removing duplicate counterfactual examples from the set of counterfactual examples.

15. The system of claim 9, wherein the machine learning model is a multivariate time series classifier that receives the query instance of a time series of input sequences.

16. A processor-readable non-transitory storage medium storing processor-readable instructions for generating a counterfactual example for counterfactual explanation in a machine learning model, the instructions being executed by a processor to perform:
receiving a query instance including a plurality of feature columns and corresponding feature values;
generating, by a machine learning model, a prediction result in response to the query instance;
identifying, from the plurality feature columns, a subset of feature columns associated with corresponding alternative feature values that would have potentially changed the prediction result;
determining an optimal policy that maximizes an expected feedback reward earned for modifying the query instance including changing a feature value of at least one feature column of the subset of feature columns;
determining a number of feature columns of the subset of feature columns and a number of associated feature values according to the determined optimal policy;
constructing a counterfactual example using a portion of the determined number of feature columns and the number of associated feature values; and
outputting, by the machine learning model, the counterfactual example as a counterfactual explanation for the prediction result in response to the query instance, wherein the optimal policy is determined by reinforcement learning (RL) in which:
changing the feature value of the at least one feature column is treated as an action in the RL;
the modified query instance is treated as a state in the RL; and
a reward function of the RL for determining the expected feedback reward is a prediction score of a different label other than the prediction result.

17. The method of claim 1, further comprising selecting to output the counterfactual example as the counterfactual explanation based on its proximity to the query instance.

18. The method of claim 1, wherein:
one of the determined number of feature columns is a continuous feature column;
the constructing the counterfactual example includes refining the associated feature value of the continuous feature column using a gradientless descent procedure to optimize the proximity of the counterfactual explanation to the query instance; and
the outputting the counterfactual example includes outputting the proximity-optimized counterfactual explanation as the counterfactual explanation for the prediction result in response to the query instance.

19. The processor-readable non-transitory storage medium of claim 16, wherein the optimal policy is determined subject to a sparsity constraint for selecting the action.

20. The processor-readable non-transitory storage medium of claim 16, wherein the subset of feature columns are identified from a number of nearest neighboring query instances to the query instance via a nearest neighbor search tree built from a training dataset.

* * * * *